United States Patent

[11] 3,578,102

| [72] | Inventors | Frederick W. Ross<br>Del Mar;<br>Peter Van Horn Serrell, Solana Beach;<br>Howard L. Shatto, LaJolla, Calif. |
|---|---|---|
| [21] | Appl. No. | 778,567 |
| [22] | Filed | Nov. 25, 1968 |
| [45] | Patented | May 11, 1971 |
| [73] | Assignee | Shell Oil Company<br>New York, N.Y. |

[54] SEISMIC GENERATOR
3 Claims, 5 Drawing Figs.

[52] U.S. Cl. .......................................... 181/0.5,
340/15.5
[51] Int. Cl. ........................................... G01v 1/04,
G01v 1/22
[50] Field of Search ............................ 340/15.5
(RTC); 181/0.5 (C3,C4)

[56] References Cited
UNITED STATES PATENTS

| 3,363,720 | 1/1968 | Mifsud et al. ............... | 181/0.5 |
| 3,219,971 | 11/1965 | Cole ............................. | 340/15.5 |
| 3,373,841 | 3/1968 | Miller .......................... | 181/0.5 |
| 3,375,896 | 4/1968 | Beddo ......................... | 340/15.5X |
| 3,386,525 | 6/1968 | Landrum et al. ............ | 340/15.5X |

*Primary Examiner*—Rodney D. Bennett, Jr.
*Assistant Examiner*—Daniel C. Kaufman
*Attorneys*—Freling E. Baker and J. H. McCarthy ABSTRACT: An inertial mass vibratory seismic signal generating system having tunable resonance over the generating frequency range.

PATENTED MAY 11 1971  3,578,102

INVENTORS:
F. W. ROSS
P. V. H. SERRELL
H. L. SHATTO, JR.
BY:
THEIR ATTORNEY

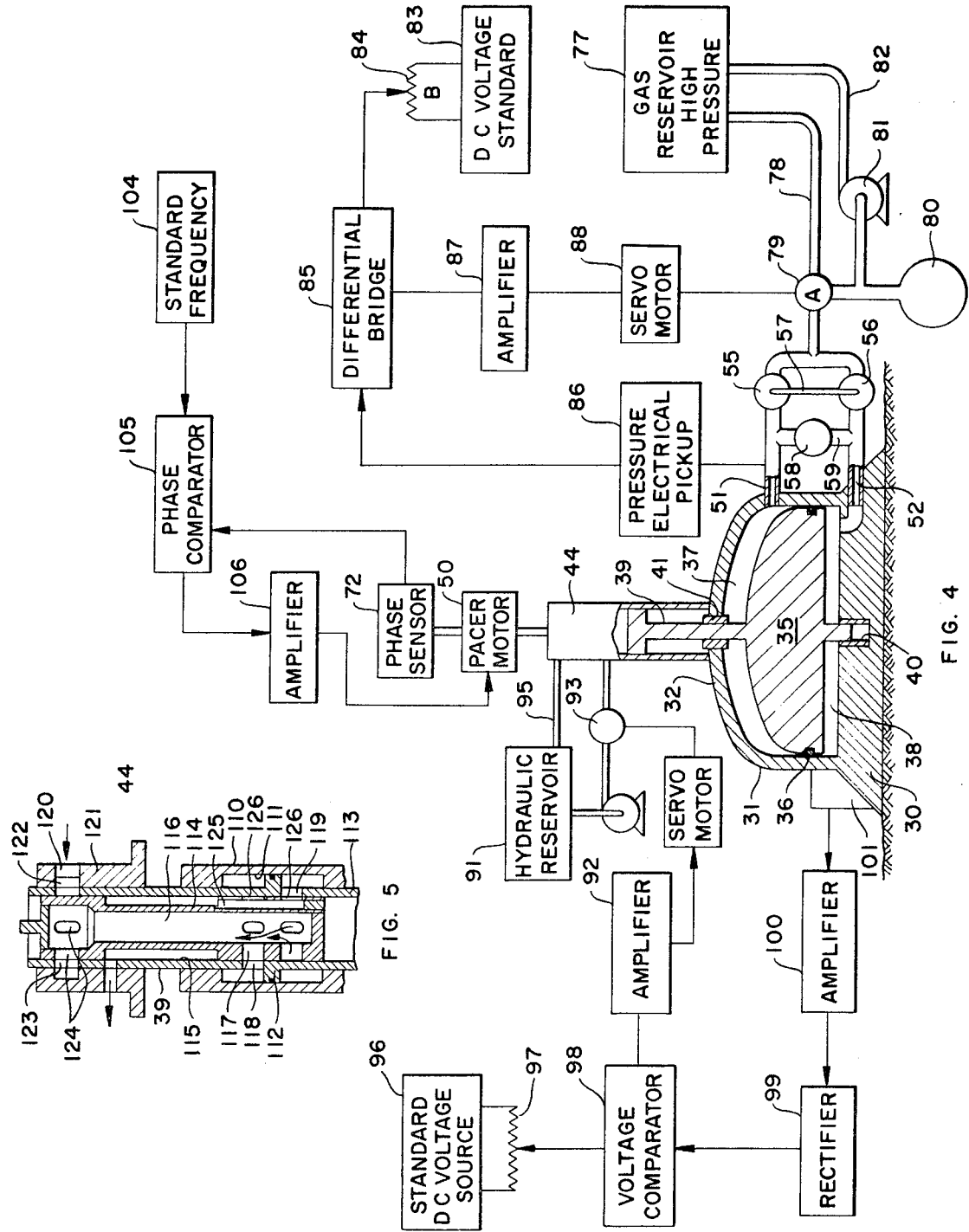

SEISMIC GENERATOR

BACKGROUND OF THE INVENTION

The present invention relates generally to improvements in surface sources of seismic energy and pertains more particularly to a tunable vibratory seismic generator.

Traditional methods of locating underground petroleum deposits is by a technique referred to as seismic prospecting. Seismic projecting is generally carried out by generating a seismic signal or wave at or near the earth's surface which travels downward into the earth with portions of the seismic wave reflecting off of discontinuities in or interfaces between various subsurface formation encountered. The reflected signals are recorded and used as a means of interpreting the existence and conditions of the subsurface formations.

The traditional technique for generating seismic signals is by the use of high explosives planted beneath the surface of the earth. The greatest drawback with such techniques is that these high explosives cannot be used in or near highly populated areas. Moreover, these techniques are time consuming and expensive in that they require the drilling of holes in which to place the charges. For this reason, great interest has recently been shown in the development of low-energy surface sources of seismic energy. The greatest drawback of the surface sources in the seismic energy is that it is often difficult to retrieve the transmitted signal from out of background noise. This is due to the low energy level of the signal. Recently, techniques have been developed in which a number of signals are transmitted and the reflected signals retrieved and then later combined to improve the signal-to-noise ratio. The difficulty with this technique is that the seismic transducer or generator must be capable of transmitting a number of identical signals which can be coded so that they may be retrieved and later combined.

One of the most popular types of signal generators presently used is the shaker or vibrator. One type of vibrator utilizes counterrotating eccentric weights to generate vibrations which are transmitted into the earth formation by means of a coupling plate. The difficulty with this type of generator is that the forces generated are directly related to the frequency. That is, as the frequency goes up, the force goes up. Such systems cannot generate the desired level of force over a wide range of frequencies without a great many changes of eccentric weight.

A more desirable type of vibrator is the reaction mass type in which a reaction mass is reciprocated relative to a coupling plate by means of an hydraulic oscillator. Such systems generally provide better frequency and force control than the eccentric weight type. A major problem with this as well as other types of surface sources of seismic energy is the lack of effective transmission of the energy from the generator into the earth formation.

One of the advantages of the vibrator-type signal generator is that the great amount of energy can be put into the ground in the form of sweep signal over a period of time. This type signal generally varies in frequency such as from 15 cycles per second up to 80 cycles per second. Such a signal is readily retrievable from background noise. One major difficulty with prior art vibrators, however, is their inability to maintain a constant amplitude of the signal transmitted to the earth as measured by particle velocity of the surface. The amplitude with these systems generally increases up to a maximum amplitude at the point of resonance frequency of the new system which includes the generator as well as the portion of the earth itself. In other words, these prior art systems are incapable of moving the area of the earth's surface where the generator is coupled at a substantially constant amplitude over the frequency range of the desired signal.

SUMMARY OF THE INVENTION

It is therefore a primary object of the present invention to overcome the above objections to the prior art devices by providing an improved seismic generating system for applying seismic signals to the earth's surface, which is operative to maintain the entire system including a portion of the earth which is dynamically coupled in resonance at all times during operation by impedance matching.

It is a further object of the present invention to provide seismic generating apparatus capable of applying a seismic signal to the earth's surface having a substantially constant amplitude over a wide range of frequencies.

It is a still further object of the present invention to provide seismic generating apparatus providing improved impedance matching to the earth's surface.

BRIEF DESCRIPTION OF THE DRAWINGS

The above and other objects and advantages of the present invention will become apparent to those skilled in the art from the following description when read in conjunction with the attached drawing in which:

FIG. 4 is a view of the apparatus of FIG. 3 with an alternative control system; and FIG. 5 is a sectional view of a suitable oscillator for operating the system of the present invention.

DESCRIPTION OF THE PREFERRED EMBODIMENT

Figure 1:
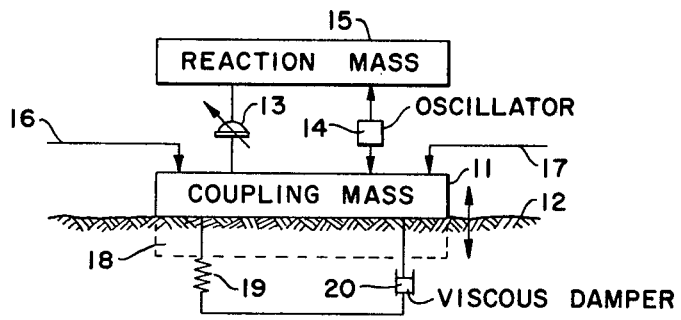
FIG. 1 is a schematic diagram illustrating the system of the present invention.

Referring now to the drawings, and in particular to FIG. 1, there is shown a schematic illustration of the system of the present invention in which a coupling mass 11 is shown resting on the surface of the earth 12 and interconnected by means of a variable rate spring 13 and a variable linear oscillator 14 to reaction mass 15 to form a vibratory system. This vibratory system, by virtue of the variable rate spring 13 has a wide range of resonant frequencies. That is, it may be tuned to be in resonance at substantially any desired frequency, such as over the operating range. Further, bias which adds to the effective mass of the coupling mass or plate 11 is supplied by a suitable transport vehicle not shown but represented by arrows 16 and 17. The portion of earth on which the system of the present invention rests also forms a vibratory system having a mass represented by the portion of earth 18, a spring represented by numeral 19 and damping represented by numeral 20. This earth's surface also has characteristic resonant frequencies. We have discovered that we can combine the above two systems to form a double resonant system and that with provisions for tuning that we can tune the above system to vibrate at a resonant frequency over a wide range of operating frequencies. With this combined system a signal having a substantially constant amplitude of motion over a wide range of frequencies is generated. This is the result of operating the entire system at its resonant frequency over the entire frequency range of the desired signal.

Figure 2:
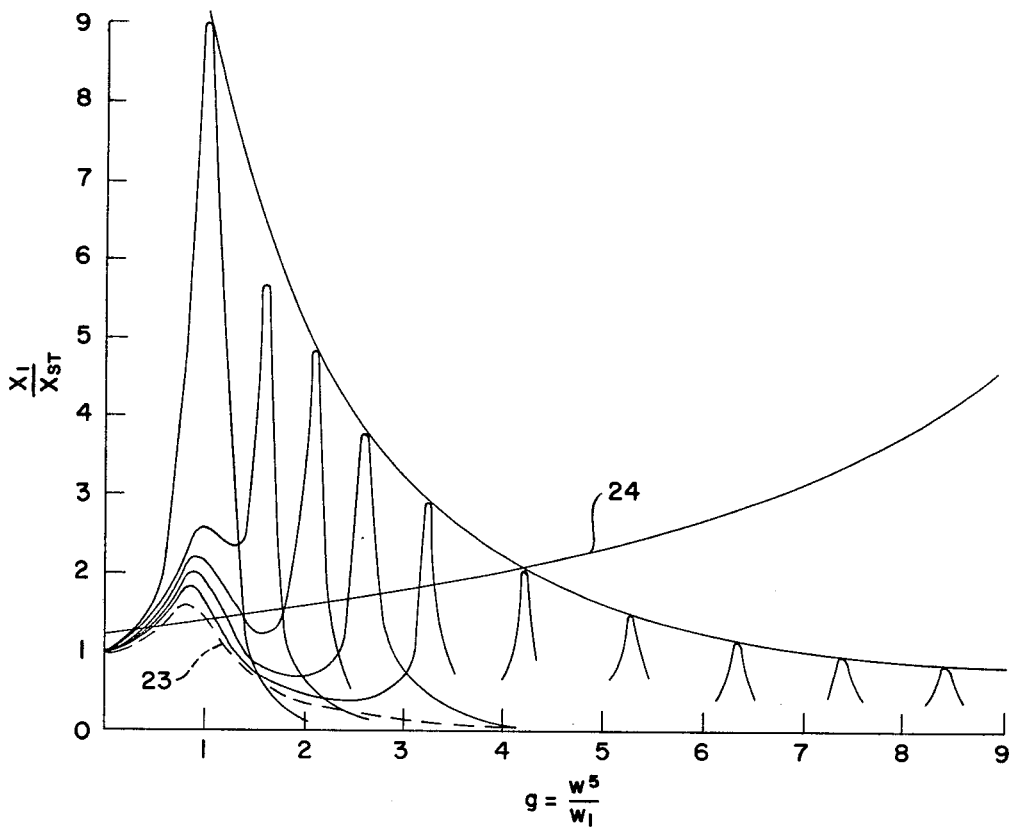
FIG. 2 is a graph in which the acoustic amplification of soil particle displacement is plotted as against the operating frequency ratio of the system.

Illustrated in FIG. 2 is a chart of typical performance curves for the present invention as compared to performance curve for a typical prior art system. The family of curves on this chart represent what may be referred to as acoustic amplification for constant force applied by oscillator 14. This acoustic amplification is a ratio of dynamic particle displacement $x_1$ over static particle displacement $x_{st}$ at the point of application of a signal to the earth formation. This is at the point of contact or coupling of the base plate of the transducer with the surface of the earth. This family of curves (solid lines) indicates performance or acoustic amplification for the various values of the operating frequency ratio and each plotted for a given value of the tuning ratio $f$ at a constant oscillator force. The tuning ratio $f$ is the ratio of the natural frequency of the subsystem comprising the mass 35 and the airspring formed by chambers 37 and 38 divided by the natural frequency of the ground system $\Omega_1$. The ground system comprises the masses 30 and 31 and reactance of the ground. The operating frequency ratio $g$ is equal to the operating frequency divided by the natural frequency of the ground system. These curves also represent the behavior of the system with a particular constant force input. As can be readily seen from the chart as the operating frequency ratio $g$ increases for a given output force of a transducer or signal generator, the acoustic amplification decreases. The dash curved line 23 in FIG. 2 is the acoustic amplification for a nontunable seismic generator applied with constant force. Line 24 in FIG. 2 illustrates a typical curve for oscillator force output in order to obtain a substantially constant acoustic amplification for the preferred embodiment. Note that the maximum acoustic amplification for a typical nontunable system as indicated by line 23 corresponds to the natural frequency of the ground system with the added weight of the generator. Note that the peak acoustic amplification for a given tuning ratio $f$ for the present invention is displaced a short distance to the right of an operating frequency ratio $g$ of the same value. For example, for a tuning ratio $f$ equal 3.0 appears somewhat to the right of an operating frequency ratio $g$ of 3.0. This relationship of tuning ratio to the operating frequency ratio is found to be substantially constant over the desired operating frequency. For this reason we have found that an adjustment of the tuning ratio $f$ to about 96 percent to the operating frequency ratio $g$ can give satisfactory performance. However, this is not a necessary condition but may be preferred in some applications for simplicity.

Figure 3:
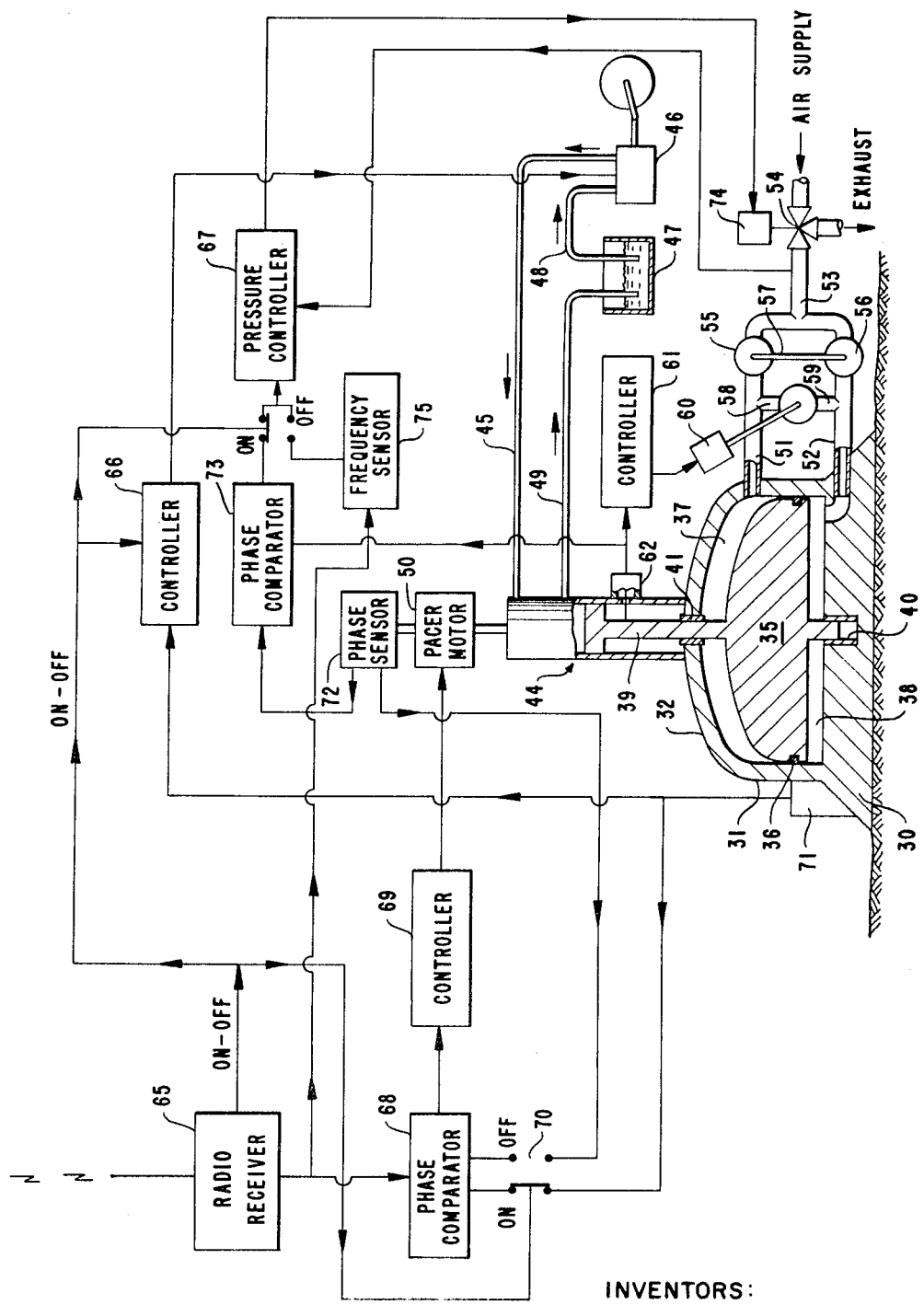
FIG. 3 is a side view partially in section of a transducer and a schematic illustration of a suitable control system constructed in accordance with the present invention.

Referring now to FIG. 3, there is shown a vibrator or transducer constructed in accordance with the present invention. A suitable coupling mass or base plate 30 has a housing member formed with a cylinder 31, formed with a domelike cylinder head 32, attached thereto in any suitable manner. The dome configuration is not an essential limitation but is for high-pressure design and for the convenience of construction only. A suitable reaction mass 35 forms a piston and is positioned within cylinder 31 and sealingly engage the walls thereof such as by means of suitable sealing or piston rings 36. Pressure chambers 37 and 38 are formed above and below the piston 35 within the cylinder 31 and thus form an adjustable or variable rate air spring which together with the related masses acts as a tunable resonator. The piston 35 is mounted in any suitable manner on a piston rod 39 which is suitably supported for reciprocation in suitable bearing means 40 in baseplate 30 and bearing means 41 in cylinder head 32. The upper end of piston rod 39 is suitably connected to a suitable variable frequency linear hydraulic oscillator 44 which is more fully detailed in FIG. 5, and the other movable part of which is in turn connected to the cylinder head to provide a base for reaction force. This schematically places the oscillator between and permits it to exert its force oppositely against both the base structure 30 and the bob weight or reaction mass 35.

Hydraulic fluid for the operation of the oscillator 44 is supplied through suitable conduit means 45 from a suitable supply source including a pump 46 and a reservoir 47 with conduit means 48 providing communications therebetween. Fluid is returned to reservoir 47 via conduit means 49. A distributor valve for controlling the distribution of hydraulic fluid to control the frequency of oscillator 44 is driven by a suitable variable speed pacer motor 50.

A suitable amount of gas or air for tuning the system is supplied to air chambers 37 and 38 through a conduit system including branch conduits 51 and 52 of main conduit 53 from a source of gas or air (not shown). A control valve 54 controls the supply of gas to and from the chambers 37 and 38. A pair of positive displacement pumps 55 and 56 are connected in the supply conduits 51 and 52 and intercoupled such as by means of a shaft 57 so as to operate together and thus meter the proportionate supplies of air into chambers 37 and 38. Centering means for maintaining mass 35 in substantially the center of the cylinder 31 comprises a reversible pump 58 positioned in branch line 59 to alternately pump gas from one chamber 37 or 38 to the other. The pump 58 is operated by means of a motor 60 which is responsive to a controller 61 which in turn is responsive as a position responsive transducer 62 operatively coupled such as to piston rod 39.

A suitable completely integrated control system for coordinated control of the variable systems of the illustrated seismic transducer of the subject invention is illustrated in FIG. 3. This control system permits the completely tuned operation of a transducer in a number of different manners such as to give short bursts at a constant frequency or to sweep over a selected range of frequencies. This system comprises means for the input or reception of a master control signal; such means may be, for example, a radio receiver 65 which is operatively connected to provide a signal of reference frequency and phase-to-phase comparator 68 and to frequency sensor 75. Receiver 65 also provides an "on-off" signal which is used to switch one input to phase sensor 68 from base plate transducer 71 to phase sensor 72, also to switch the set point adjustment of pressure controller 67 from phase comparator 73 to frequency sensor 75, and also to turn controller 66 on and off. Phase comparator 68 is operatively connected to control pacer motor 50 through controller 69. The phase comparator 68 may be, for example, like that disclosed in U. S. Pat. No. 3,210,661, entitled Phase Comparator Circuit, issued Oct. 5, 1965 to H. L. Shatto, Jr. A phase comparator 73 is operatively connected to phase sensor 72, position transducer 62 and for input to controller 67 which is operatively connected to control servomotor 74 which controls air supply valve 54 which tunes the system.

Referring now to FIG. 4, there is illustrated an alternate control system in which the various control functions, such as tuning and oscillator force, may be adjusted independently of one another. The basic transducer is the same as that of FIG. 3 and the same numerals are used to denote identical elements.

In this embodiment the resonator tuning system comprises a system for supplying a suitable gas which may be, for example, $N_2$ to the chambers 37 and 38 to tune the system. This system comprises a suitable high-pressure gas reservoir 77 which is operatively connected by means of a conduit 78 to conduits 51 and 52 which are connected to supply gas directly to the chambers. A suitable servovalve 79 controls the flow of gas from the reservoir 77 to and from chambers 37 and 38 to increase the pressure therein or from these chambers into a suitable expandable exhaust reservoir 80 to reduce the pressure in these chambers. A suitable pump 81 operatively coupled in conduit system 82 returns the gas under high pressure to reservoir 77.

A control system for controlling the tuning of the resonator comprises suitable signal generating means, such as a standard source of DC voltage 83 operatively connected through adjustable means 84 to a differential bridge 85 which in turn is operatively connected to pressure-sensing means 86 and to amplifier 87 which is operatively connected to servomotor 88 for operating valve 79. Thus, a signal differential between source 83 and sensing means 86 is amplified in amplifier 89 and fed to servomotor 88 to adjust the pressure in chambers 37 and 38 and consequently the resonant frequency of the system.

Hydraulic fluid for operation of oscillator 44 is supplied by means of a system comprising a reservoir 91 operatively connected by means of conduit system comprising a pump 92 and a control valve 93 and conduit means 94. A conduit means 95 is operatively connected to return fluid from oscillator 44 to reservoir 91. Suitable control means for this hydraulic system comprises a signal source, such as standard DC voltage supply 96 operatively connected with adjustable means 97 to voltage comparator 98 which is operatively connected through a rectifier 99 and amplifier 100 to a velocity or displacement transducer 101. The voltage comparator 98 is also operatively connected to an amplifier 102 which is operatively connected to a servomotor 103 for operating valve 93. This system is to adjust the output force of oscillator 44 and the resulting output amplitude of baseplate 30 in response to control signal from master control signal source 96.

A suitable control system for oscillator 44 comprises means such as a variable speed motor 50 operatively coupled to operate hydraulic distributor valves in oscillator 44. A suitable source of standard frequency signals 104 is operatively connected to a phase comparator 105 which is operatively connected to an amplifier 106 and a phase sensor 107 for pacer motor 50. The amplifier is operatively connected to pacer motor 50.

Referring now to FIG. 5, there is illustrated a suitable oscillator 44 for driving or powering the transducer of the present invention. The oscillator 44 comprises a body member 110 having a cylindrical bore 111 in which is reciprocably mounted a double-acting piston 112. The piston 112 may be either formed on or operatively coupled to a piston rod 113. Either one of piston rod 113 or body member 110 may be coupled to mass 35 by way of piston rod 39 and the other to mass 30 by means of housing 31 and 32. A rotary distributor valve 114 is rotatably mounted in cylindrical bore 115 of piston rod 113. Hydraulic fluid under pressure is supplied to alternate sides of piston 112 by means of a control passageway 116 in communication with a plurality of radial ports 117 in valve body 114 which alternately communicate with radial port 118 above piston 112 and radial port 119 below piston 112. The fluid is supplied to passageway 116 through port 120 in body member 121 to annular passageway 112 which communicates with a plurality of radial ports 123 in member 113 and radial ports 124 in member 114.

Fluid is exhausted from the chambers on either side of piston 112 by means of a plurality of low-pressure passageways 125 in body member 114 communicating by means of a plurality of radial ports 126 which alternately communicates with radial ports 118 above piston 112 and radial ports 119 below piston 112. Passageway 125 further communicates with annular passageway 127 which in turn communicates with annular passageway 127 which in turn communicates by way of radial port 128 in member 113 which exhaust port 129 in member 121.

OPERATION

In operation of the present invention in the sweep mode, considering the system of FIG. 3, the system is designed to respond to two commands or conditions; one is preparatory to vibratory operation corresponding to the "OFF" condition in FIG. 3, and the other is the vibratory operation corresponding to the "ON" condition in FIG. 3. In the preparatory condition, the master control signals a staring frequency at either the high end or the low end of the desired frequency spectrum. This staring frequency is applied to phase comparator 68, where it is compared to the output signal from phase sensor 72. The resulting signal directs controller 69 to advance or retard, or in effect to control the phase position of the pacer motor shaft to the precise frequency and, more accurately, to correct phase within that frequency as directed by the master signal. At the same time the master signal is commanding the system through receiver 65 to respond to the "OFF" condition which permitted connection of phase sensor 72 to phase comparator 68 and also provides a signal to controller 66 to cause the pump 46 to put out no hydraulic fluid and therefore to cause no vibratory signal. The "OFF" signal also connects the master signal frequency sensor to the set point adjustment of pressure controller 67. This requires the controller 67 to adjust the pressure in the head spaces 37 and 38 to a value determined by the master signal frequency in a preestablished second power relationship such that the pressure is proportional to a constant times the square of the signal frequency. This preset value of pressure in the head spaces 37 and 38 corresponds to peak system resonance for the preparatory frequency being received. Thus, at the instant of start of the sweep, the system is prepared by having the pacer motor running at starting speed and frequency by having the pressure in the head space tuned to resonance at that frequency and by having the hydraulic flow turned off.

Upon receiving the "ON" command the controller 66 is directed to increase output of pump 46 until the desired value of its measured variable, the motion amplitude of the baseplate from transducer 71 has been achieved. Simultaneously, the adjustment of air-spring pressure to ensure peak resonant response at any desired frequency is controlled by controller 67 based upon the coincidence of phase of the oscillator force and velocity. This coincidence may be assured by any method that causes the hydraulic valves to be switched at the instant the bob weight and oscillator reach the end of the stroke in each direction, or conversely that causes the bob weight to reach the end of its stroke at the instant the valves are switched. In the case shown, the latter is accomplished by knowing the precise phase relationship between the rotary valve ports in oscillator 44 and the corresponding output signals of phase sensor 72 and comparing in phase comparator 73 the phase of these signals with the phase of the position of the bob weight 35. The controller 67 causes the phase of bob weight 35 to advance or retard as required by phase comparator 73 by respectively increasing or decreasing the pressure in the head space. In the case not shown where the valves are switched by the arrival of the bob weight at the end of its stroke, then the phase of baseplate motion would be matched to the master signal by adjusting pressure in the air spring. In the case shown, having established a fixed phase relationship between the pacer drive 50 and the bob weight 35, the precise relationship between the baseplate motion from transducer 71 and the incoming master signal can be measured by phase comparator 68 and controlled by advancing or retarding the pacer motor 50 as directed by controller 69. This accomplishes the final desired result by locking the phase of the baseplate 30 to the phase of the incoming master signal. The master signal may then be swept from one end of its spectrum to the other with the base plate of each signal generator locked in precise phase relationship to it.

The system described here for sweep frequency operation can be adapted to operation with discrete bursts of vibratory energy at discrete steps of frequency simply by programming such operation on the master signals.

Thus, from the above description it can be seen that there is disclosed a variably resonant seismic generating system comprising a pair of masses interconnected by means of variable rate spring means and a variable frequency oscillator to form a system that is tunable to resonance over a wide range of frequencies.

This system includes support means, a first mass carried by the support means and engageable with the surface of the earth, and a second mass carried by the support means and reciprocably mounted with respect to the first mass. An alternating force oscillator is connected to at least one of the masses for moving said mass relative to the other mass, and variable-rate spring means operatively connects the first and the second masses to form a variable resonant system. Means are provided for adjusting the rate of the spring means to adjust the resonant frequency of the system.

Also disclosed is a control system for the above generating system, which control system includes a control signal source having an output signal. Resonant frequency control circuit means are provided which are responsive to a signal from the source to adjust the resonance frequency of the generating system. The control system also includes driving frequency control circuit means which is responsive to a signal from the source to control the operating frequency of the generating system to operate at its resonant frequency.

I claim:
1. A resonant seismic signal generating system, said system comprising:
   coupling means adapted for coupling said system to the surface of an earth formation;
   a inertia mass reciprocably supported relative to said coupling means;
   adjustable elastic means including a cylindrical chamber operatively coupling said inertia mass to said coupling means;

said inertia mass comprising a piston reciprocably mounted in said chamber;

a hydraulic oscillator operatively coupled in parallel with said elastic means between said inertia mass and said coupling means to reciprocably move said inertia mass relative to said coupling means.

2. The system of claim 1 comprising means to adjust the center of stroke of said piston in said chamber.

3. The system of claim 1 wherein the means to adjust the center of stroke of said piston includes position responsive means responsive to the position of said piston within said cylinder and initiating a signal in response thereto;

controller means responsive to said signal to control the relative amount of air in said cylindrical chamber to either side of said piston means.